US012640006B2

(12) United States Patent
Bowden et al.

(10) Patent No.: US 12,640,006 B2
(45) Date of Patent: May 26, 2026

(54) MODULAR BEZEL FOR FACILITATING PLAYER TRACKING FUNCTIONS AT A GAMING DEVICE

(71) Applicant: M3 Technology Solutions, LLC, Norman, OK (US)

(72) Inventors: Kent Dwight Bowden, Norman, OK (US); Paul Kenneth Cernuto, Las Vegas, NV (US)

( * ) Notice: Subject to any disclaimer, the term of this patent is extended or adjusted under 35 U.S.C. 154(b) by 154 days.

(21) Appl. No.: 18/366,663

(22) Filed: Aug. 7, 2023

(65) Prior Publication Data

US 2024/0046744 A1 Feb. 8, 2024

Related U.S. Application Data

(60) Provisional application No. 63/370,656, filed on Aug. 6, 2022.

(51) Int. Cl.
*G07F 17/32* (2006.01)
*G07F 17/34* (2006.01)

(52) U.S. Cl.
CPC ...... *G07F 17/3239* (2013.01); *G07F 17/3216* (2013.01); *G07F 17/3223* (2013.01); *G07F 17/34* (2013.01)

(58) Field of Classification Search
CPC ............. G07F 17/3239; G07F 17/3216; G07F 17/3223; G07F 17/34
See application file for complete search history.

(56) References Cited

U.S. PATENT DOCUMENTS

2010/0069160 A1* 3/2010 Barrett ................ G07F 17/3218 463/47
2010/0240455 A1* 9/2010 Gagner ............... G07F 17/3227 463/30
2013/0053129 A1* 2/2013 LeMay ............... G07F 17/3223 463/25
2017/0251366 A1* 8/2017 Perna ...................... G06F 21/32

* cited by examiner

*Primary Examiner* — Werner G Garner
(74) *Attorney, Agent, or Firm* — Downs IP Law PLLC; Michael Downs

(57) ABSTRACT

Systems, apparatus, and methods are provided for a player tracking interface device comprising a shelf for holding a mobile device, and using the held mobile device to provide and receive player tracking information.

23 Claims, 5 Drawing Sheets

MODULAR BEZEL FOR FACILITATING PLAYER TRACKING FUNCTIONS AT A GAMING DEVICE

FIELD OF THE INVENTION

The present invention relates to player tracking devices and systems for players of gaming devices.

BACKGROUND

Many types of customers, including players at casinos and other gaming establishments, are in possession of one or more mobile devices (e.g., smart phones, laptop computers, and/or tablet computers) when visiting a business location. Some types of prior art systems take advantage of the communication capabilities of mobile devices to communicate with and provide various services to a customer, including to facilitate some player tracking system functions for players at casinos.

Despite the common availability of mobile devices and the increasing familiarity of customers with using their mobile devices to interact with various types of business systems, prior art systems have failed to optimize structural and environmental elements to accommodate customers' use of their mobile devices while at a business establishment. Prior art systems have also failed to optimize use of the input, output, and/or communications components of mobile devices for interacting with players. Prior art systems have also failed to provide for modular or unitary solutions that allow for new types of customer-facing devices (e.g., gaming machines and kiosks and/or allow for modifying or retrofitting existing devices, to facilitate the use of mobile devices in interacting with various business services.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
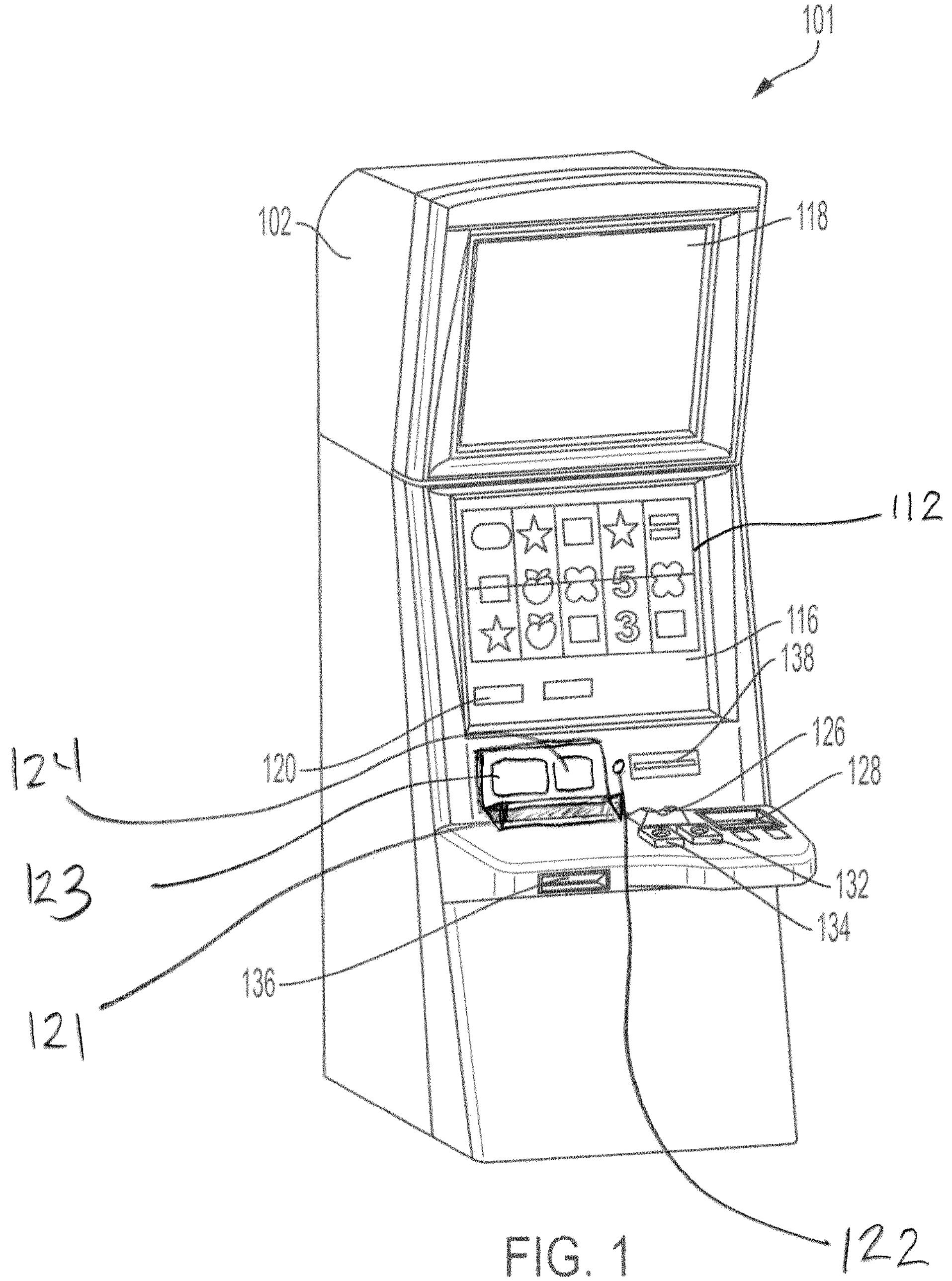
FIG. 1 is a diagram of a gaming device according to an embodiment of the present invention.

In accordance with some embodiments of the present invention, an apparatus for facilitating interaction between a player and a player information system (e.g., a player tracking system, a club patron reward system) is provided comprising one or more of the following components:

a) a shelf, platform, or holder for holding a mobile device of a player (e.g., to hold a player's smart phone while the smart phone is interacting with the player's club patron reward system);

b) a wireless communications transceiver (e.g., an NFC reader, a Bluetooth™ transceiver);

c) a wireless mobile device charger (e.g., a phone charger configured to charge a phone battery configured for wireless charging without a wired connection between the charger and the phone);

d) a camera (e.g., for use in identifying a customer such as a player at a gaming device);

e) a card reader (e.g., for use in receiving information that may be useful in identifying a player, such as identification information stored on or otherwise accessible via a player tracking card, credit card, debit card, or the like); and/or f) a PC board (e.g., a computer board configured to interface with a customer-facing device such as a gaming device and/or kiosk).

In accordance with some embodiments of the present invention, an apparatus for facilitating interaction between a player and a player information system (e.g., a player tracking system, a club patron reward system) is provided comprising one or more of the following components:

a) an angled shelf that is configured to hold a mobile device such that a display and/or interface of the mobile device is easily viewable and/or accessible by the player for interacting with a player tracking system (e.g., so that player information can be displayed to the player and/or the player may interact with a touchscreen at a comfortable viewing angle);

b) an NFC reader;

c) a wireless phone charger;

d) a camera;

e) a card reader;

f) a light source (e.g., light-emitting diode (LED)); and/or g) a PC board.

In accordance with some embodiments, a modular apparatus as described in this disclosure may be used to support traditional gaming and/or cashless gaming.

In one example, the shelf is configured to hold a mobile device at a comfortable viewing angle for a player standing or sitting next to the shelf (e.g., in front of a gaming device).

In accordance with some embodiments, a modular apparatus as described in this disclosure may comprise one or more light sources, such as LED lights. In some embodiments, control of the light sources (e.g., by a player tracking system and/or a slot machine interface board (SMIB)) may be exercised to provide various types of visual indications deemed desirable in a particular embodiment. In one example, an LED light may display with a green color to indicate a successful connection of a mobile device to wireless communications transceiver, a player tracking system, and/or a gaming device; and/or to indicate the mobile device is fully charged. In another example, a red color may be used to indicate a lack of communication between a mobile device and a wireless communications transceiver, a player tracking system, and/or a gaming device.

In accordance with some embodiments of the present invention, a player tracking system provides for one or more of the following:

a) a player tracking server;

b) a player tracking interface device comprising a shelf for holding a mobile device; and/or c) a mobile device associated with a player (e.g., in communication with the player tracking interface device).

In some embodiments, the player tracking interface device may be embodied in and/or in communication with a gaming device.

In accordance with some embodiments of the present invention, a gaming device provides for one or more of the following:

a) a gaming controller for providing game play; and b) a player tracking interface device comprising a shelf for holding a mobile device.

In accordance with some embodiments of the present invention, a method comprises one or more of:

a) detect placement of a mobile device on a shelf of a player tracking interface device;

b) identify a player associated with the mobile device;

c) provide player information associated with the player via a display of the mobile device while the mobile device is placed on the shelf;

d) charging the mobile device;

e) receiving player identification information;

f) verifying an identity of the player;

g) transmitting player identification information to a player tracking server.

In some embodiments, a user, such as a player of a gaming machine, may interact with the gaming machine without having to keep their mobile device (e.g., smart phone) in contact with a holder of a player tracking device. In this way, the mobile device is freed up and a player may be able to use their mobile device for other purposes (e.g., using various apps, making calls or other types of communications). In accordance with some embodiments of the present invention, a method comprises one or more of:

a) detect placement of a mobile device on a shelf of a player tracking interface device;

b) receiving player identification information;

c) verifying an identity of a player;

d) after verifying the identity of the player, not requiring a mobile device to remain placed on the shelf while the player interacts with a gaming device;

e) determining the identity of the player must be verified again (e.g., for a financial transaction, for a cashout process, etc.);

f) prompting the player to place the mobile device on the shelf again or otherwise initiate a connection between the mobile device and the player tracking system (e.g., by tapping the mobile device to an NFC transceiver of the player tracking interface device); and g) after detecting the mobile device again:
receiving the player identification information, and verifying the identity of the player a second time.

In one example, a player tracking system may include one or more servers and any number and type of gaming devices including but not limited to electronic gaming machines. The server and a gaming device may be configured to communicate with one another via a network (e.g., a wired and/or wireless communications network).

According to some embodiments, a player tracking interface device, such as a modular player tracking apparatus as described in this disclosure, may be provided for communicating with a player's mobile device. The player tracking interface device may be configured to communicate with nearby mobile devices via a player tracking interface embodied in the player tracking interface device. In one embodiment, the player tracking interface device may comprise a communications component for implementing one or more wireless communication protocols, such as Bluetooth™, Wi-Fi™, and/or near-field communication (NFC) protocols.

According to some embodiments, the player tracking interface device may comprise a shelf comprising one or more of a docking station, a mobile device charger (e.g., a wireless phone charger), and/or an NFC reader. The player tracking interface device may be configured, for example, to provide communications between the gaming device and the mobile device and/or to provide power to the mobile device (e.g., by way of a wireless phone charger).

According to some embodiments, the player tracking interface device may comprise a controller for controlling one or more component devices of the player tracking interface device, independently of the game device. For instance, a player tracking interface device may include a card reader and/or a network interface. According to some embodiments, the player tracking interface device establishes a connection with a player's mobile device and uses a video display and/or a touch screen of the mobile device to receive input and provide output.

For example, a controller device of the player tracking interface device may control one or more input and output devices of the player tracking interface device to provide various types of player tracking services (e.g., loyalty programs, bonusing programs) at a gaming device. One advantage of performing player tracking functions via a connected mobile device (e.g., under the direction of a controller of the player tracking interface, of a remoter server, and/or of the gaming device) is taking advantage of the displays available on mobile devices that are generally larger than those provided in typical dedicated player tracking interface devices installed at gaming devices.

Turning to FIG. 1, there is shown an example gaming device 101 according to some embodiments of the present invention. The device 101 includes a housing 102 supporting various components. The housing 102 contains a game processor (the game processor may be any processor communicatively connected to gaming device 101 and is not visible in the drawing figures but which may be positioned anywhere within or without gaming device 101) that controls the functions of the gaming device 101 (e.g., any slot machine or gaming machine form, such as a 3-reel spinning reel slot machine, video keno, video poker, video lottery, video blackjack or the like).

As shown, the example gaming device 101 comprises a primary game display 116, a bonus display 118, and a player credit meter 120.

According to some embodiments, each of the primary game display 116 and/or the bonus display 118 may be embodied respectively as a video display such as a CRT, LCD, plasma, or other electronic display, or may be embodied as a view glass to view one or more electro-mechanical devices, such as three or more electro-mechanical reels and/or a bonus wheel or other bonus generating device, as is known in the art.

Optionally, the housing 102 mounts a plurality of control buttons and/or other types of input devices, positioned below primary game display 116 to provide input to the game processor for conducting the primary game. In one example, the gaming device 101 depicted in FIG. 1 includes a game play input device in the form of one or more game play initiation buttons 132. In some embodiments, one or more game play initiation buttons 132 may be configured to allow for selection of the player's wagering choices. For example, the game play initiation buttons 132 may be configured with a BET ONE button to place unit-sized wagers, a MAX BET button to place a wager for the maximum amount permitted, and/or a SPIN button (not shown in FIG. 1) to signal the end of wagering (if the player has not placed the maximum wager permitted) and initiate play of the primary game.

In another example, an input device of gaming device 101 may comprise a cash out device in the form of a cash out button 134, which, if depressed by the player, controls the game processor to release stored game credits as indicated in the player's credit meter 120 to the player in the form of tokens, a voucher, or the like.

Optionally, input described with respect to this example gaming device 101 may be received by physical buttons and/or through touch areas on a touch screen (e.g., of primary game display 116).

To enable a player to purchase game credits, gaming device 101 may include a bill acceptor to receive currency, vouchers, or the like. The example gaming device 101, in accordance with some embodiments, may include various types of payment devices, such as, but not limited to: a combined bill and ticket acceptor 128 and a coin slot 126. Other means, such as a token acceptor or a debit or credit card reader, may be provided, as is known in the art.

A token receiving tray may also be provided to receive tokens dispensed by gaming device 101 when the player cashes out any stored game credits. As is well-known in the art, the device may return stored game credits in the form of vouchers that may be printed from a printer such as a ticket in-ticket out receiver 136 that accepts bills or vouchers, and dispenses vouchers.

According to one embodiment, the example gaming device 101 depicted in FIG. 1 includes a card reader 138 of a player tracking interface device configured to read a player identification card inserted into the card reader. In one embodiment, the player tracking interface device further comprises a shelf 121, a camera 122, a wireless mobile device charger 123, and a wireless communications transceiver 124.

Figure 2:
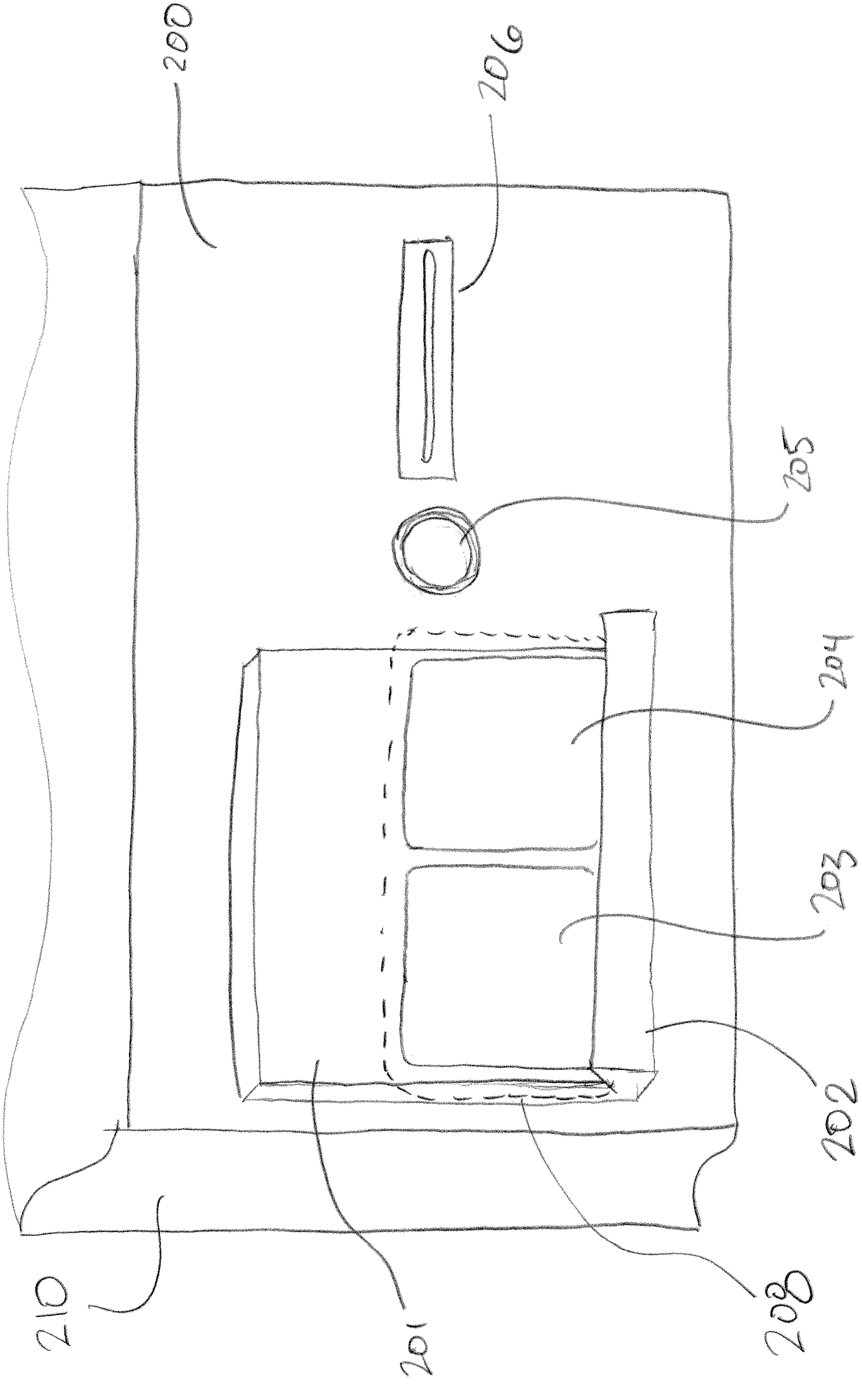
FIG. 2 is a diagram of an apparatus according to an embodiment of the present invention.

An example player tracking interface device is depicted in FIG. 2. FIG. 2 depicts an example embodiment of a player tracking interface device showing an example configuration and angle of a shelf 202 for holding a mobile device (an example placement of which is indicated with dashed lines at 208) such as a tablet computer and/or smart phone. As shown in FIG. 2, the player tracking interface device may be embodied with various components connected via a support 201 and/or a housing 200 to a cabinet and/or other housing structure of a customer-facing device 210 (e.g., a gaming device).

According to some embodiments, the player tracking interface device may comprise an NFC reader/transceiver 203 and/or a wireless charger 204 for charging a battery of a mobile device placed on the shelf 202. The example player tracking interface device, as depicted in FIG. 2, further comprises a camera 205 and a card reader 206. A modular player tracking interface device may further comprise one or more electronic connections (e.g., one or more USB connectors, a PC board) (not shown) for interfacing with a corresponding computing device/controller device in a gaming machine (e.g., SMIB) to interface with the gaming machine. One or more components may connect to a computing device via the same connection and/or individual components may have their own respective connection to the computing device of a customer-facing device.

Figure 3:
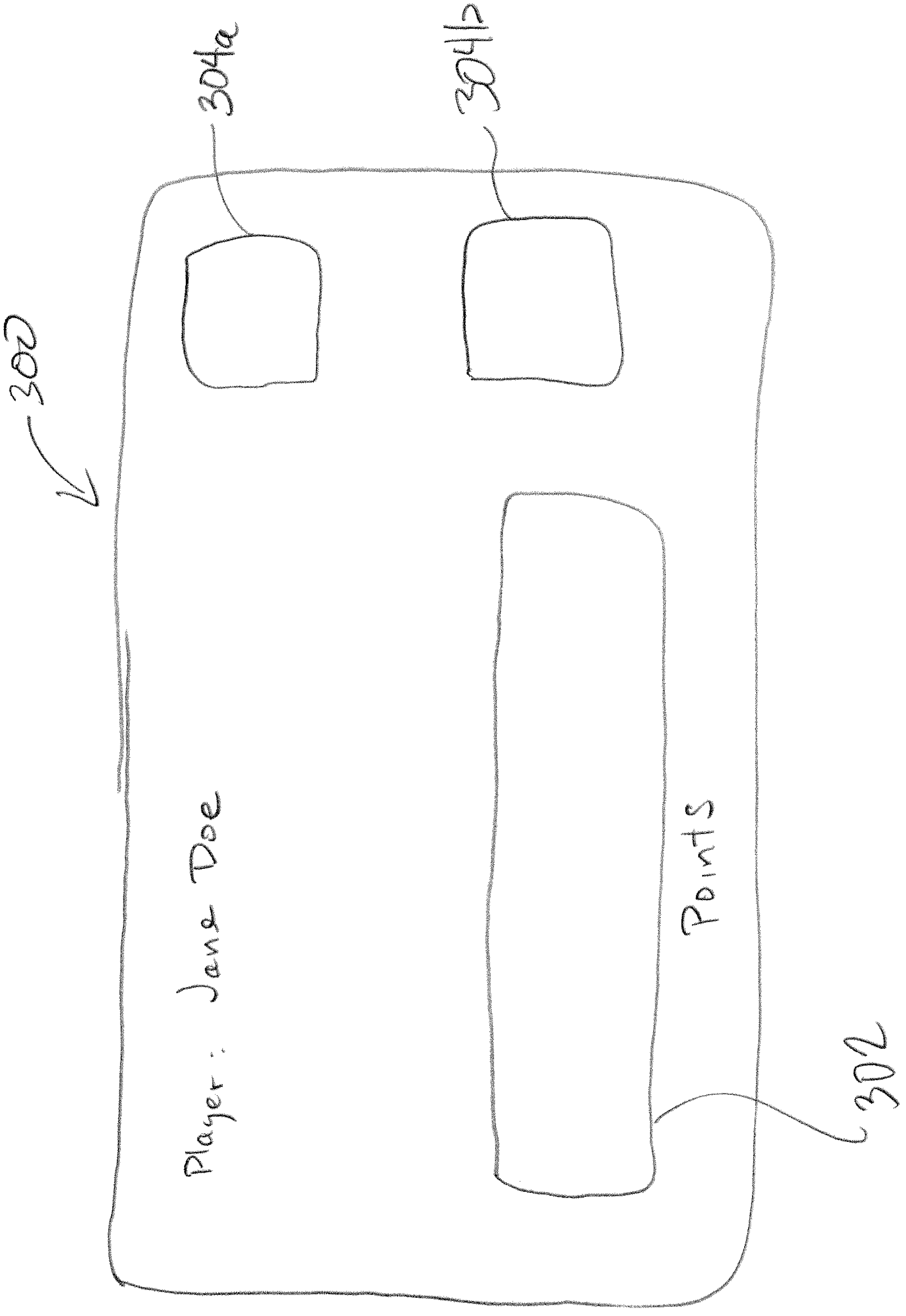
FIG. 3 is a diagram of an example mobile device display interface according to an embodiment of the present invention.

FIG. 3 depicts a diagram of an example user interface 300 of a mobile device having an interface comprising at least one button 304*a*-*b* (e.g., for interacting with a player tracking system) and at least one example of player tracking information 302 (e.g., "Points") displayed for the player via the example mobile device. According to some embodiments, any types of information tracked and/or stored in association with a financial services system and/or player tracking system, including but not limited to transaction information, cashout information, player information, promotional information, bonusing information, and gamification information, may be provided via the example user interface 300 in accordance with a desired implementation.

Figure 4:
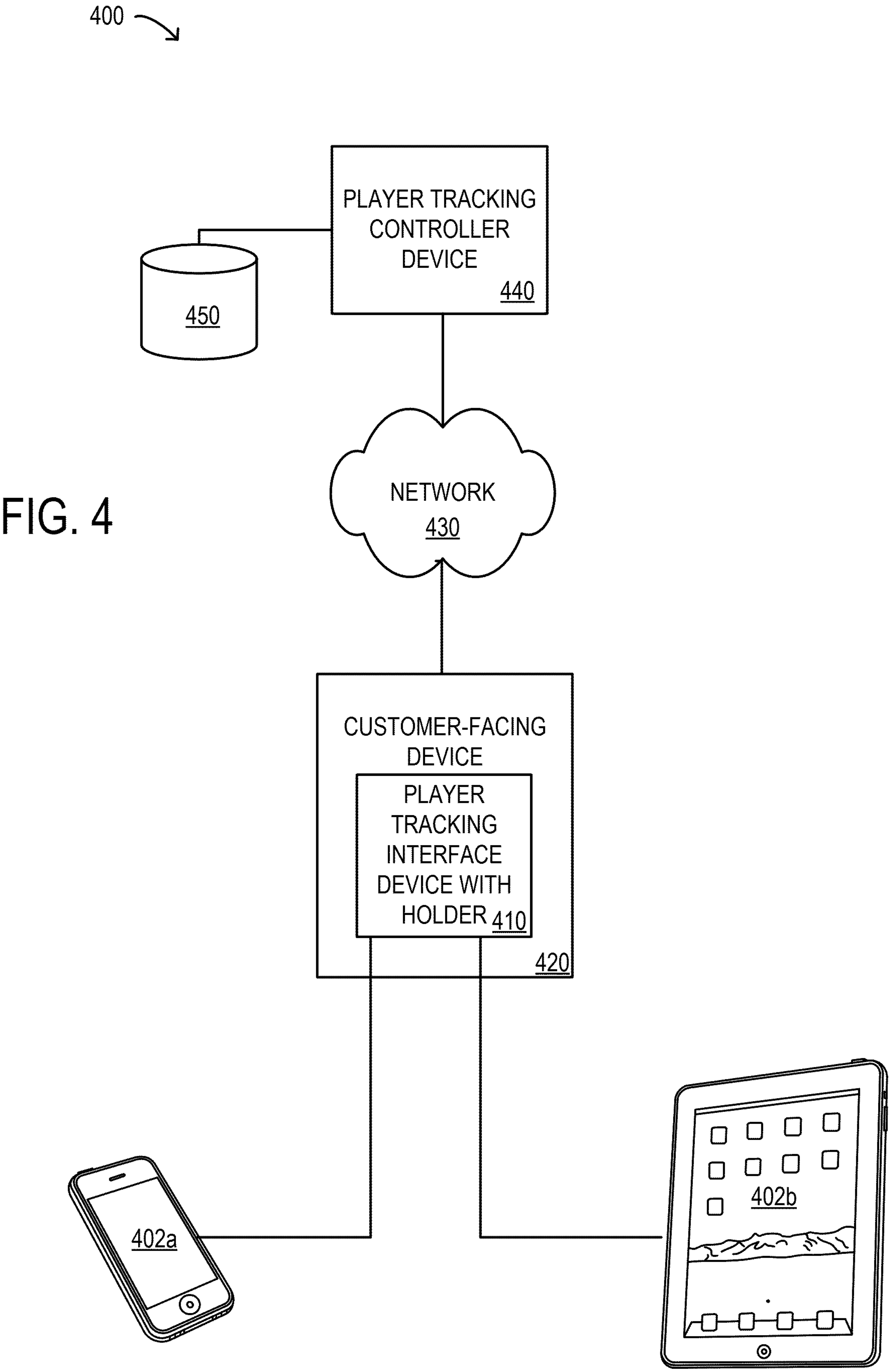
FIG. 4 is a diagram of a system according to an embodiment of the present invention.

FIG. 4 depicts a block diagram of an example system 400 according to some embodiments. The system 400 may comprise one or more mobile devices 402*a*-*b* in communication with a player tracking interface device with holder 410 in communication with a customer-facing device 402. According to some embodiments, the customer-facing device 420 (e.g., a gaming device, a kiosk, an automated teller machine (ATM)) is in communication with a player tracking controller device 440 via a network 430. According to some embodiments, the player tracking controller device 440 may be in communication with one or more player tracking databases 450.

In some embodiments, the customer-facing device 420 and/or the player tracking controller device 440 may comprise one or more electronic and/or computerized controller devices such as computer servers communicatively coupled to interface with the player tracking interface device with holder 410 and/or mobile device 402*a*-*b* (directly and/or indirectly). According to some embodiments, the player tracking controller device 440 may be located remote from the player tracking interface device with holder 410, the customer-facing device 420, and/or the mobile device 402*a*-*b*. The player tracking controller device 440 may also or alternatively comprise a plurality of electronic processing devices located at one or more various sites and/or locations.

The mobile devices 402*a*-*b*, in some embodiments, may comprise any types or configurations of mobile electronic network, user, and/or communication devices that are or become known or practicable. The mobile devices 402*a*-*b* may, for example, comprise cellular, tablet devices, laptop devices, and/or smart phones. The mobile device 402*a* may, as depicted for example, comprise a smartphone, and the mobile device 402*b* may comprise a tablet computer (e.g., an iPad™ media device).

Typically a processor (e.g., one or more microprocessors, one or more microcontrollers, one or more digital signal processors) of a mobile device 402*a*-*b*, the player tracking interface device with holder 410, customer-facing device 420, and/or player tracking controller device 440 will receive specially programmed instructions (e.g., from a memory or like device), execute those instructions, and perform one or more processes defined by those instructions. Instructions may be embodied for example, in one or more computer programs and/or one or more scripts.

Any processes described in this disclosure do not necessarily imply a fixed order to any depicted actions, steps, and/or procedures, and embodiments may generally be performed in any order that is practicable unless otherwise and specifically noted.

In one example process in accordance with some embodiments, a player in possession of a smart phone is in proximity of a gaming device comprising a player interface tracking device having a shelf for holding a mobile device (see, e.g., FIG. 1). On placing her smart phone on the shelf, the smart phone interacts with an NFC reader embedded in the shelf and establishes communication with the gaming device and/or with a server for controlling a player tracking system. The player is able to utilize various functions of the player tracking system using her own mobile device as the primary interface to the player tracking system. The viewing angle and/or orientation of the smart phone on the shelf make it easy to view and/or use the touchscreen of the smart phone in this manner. Further, in accordance with some embodiments, the player's smart phone is able to charge wirelessly while the player is at the gaming device, using a wireless charger embedded in the shelf. In one example, the player is able to identify herself to the player tracking system using (i) identifying information on the phone (e.g., stored in a player tracking application), (ii) a card presented via a card reader, and/or (iii) and/or through use of a camera (e.g., a camera integrated in her smart phone and/or a camera integrated in the player tracking interface device) to take a picture for purposes of identity verification (e.g., executed by or under control of a player tracking server).

Figure 5:
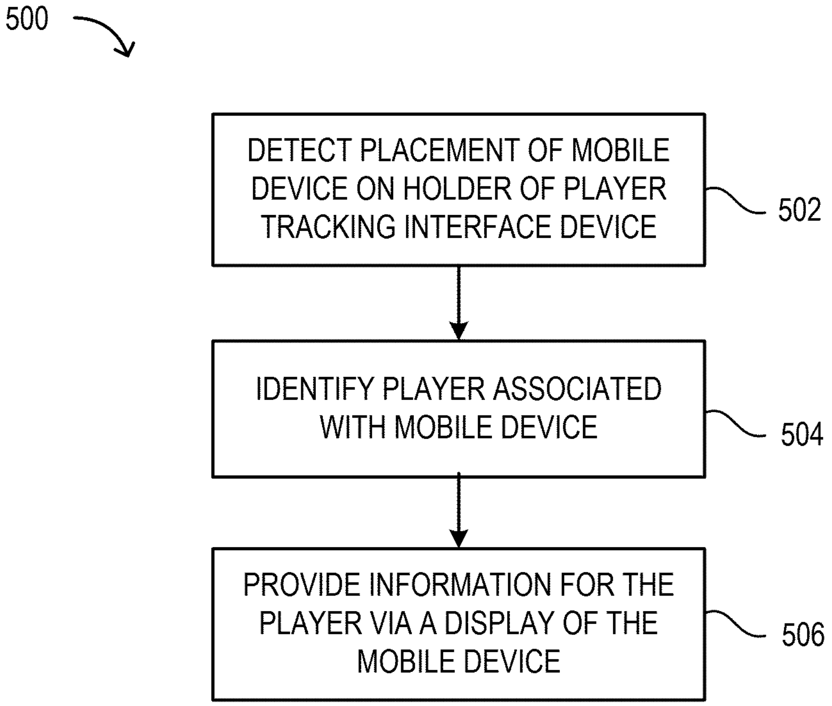
FIG. 5 is a flowchart of a method according to an embodiment of the present invention.

Referring now to FIG. 5, a flow diagram of a method 500 according to some embodiments is shown. The method 500 may be performed, for example, by a player tracking interface device, a gaming device (e.g., a video slot machine), and/or a server computer in communication with a gaming device and/or with a player tracking interface device. It should be noted that although some of the steps of method 500 may be described as being performed by a player tracking interface device and/or a gaming device, one or more steps may be performed by another computing device, and any and all of the steps may be performed by a single computing device which may be a standalone or networked slot machine, mobile device, desktop computer, or another computing device.

According to some embodiments, the method 500 may comprise detecting placement of a mobile device on a holder of a player tracking interface device, at 502. According to some embodiments, the method 500 may further comprise identifying a player associated with the mobile device, at 504, and providing information for a player via a display of the mobile device, at step 506. It will be understood that various types of player tracking systems may be configured to provide various types of information to identified players, such as information in association with promotional, bonusing, and/or gamification services. According to some embodiments, the information for a player may comprise one or more of: player information (e.g., information about a player's identity), player account information (e.g., points balance), promotional information (e.g., a promotional offer determined and displayed to the player), bonusing information, and/or gamification information.

In one or more embodiments, generating the one or more bonus prize indicia comprises generating the bonus prize indicia in response to, on detection of, or after determining the occurrence of the bonus generating event for the primary game play. For example, after determining the appearance of bonus generating game symbols on an active payline, a gaming device may activate or otherwise control a bonus generating apparatus, such as a wheel, to produce the bonus prize indicia.

Interpretation

Numerous embodiments are described in this patent application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention may be practiced with various modifications and alterations, such as structural, logical, software, and/or electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features that must be present in all embodiments.

Neither the Title (as may be set forth at the beginning of the first page of this disclosure) nor the Abstract (as may be set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car, and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term "process" or a like term. Accordingly, any reference in a claim to a "step" or "steps" of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

As used in this disclosure, a "user" may generally refer to any individual and/or entity that operates a user device.

Some embodiments may be associated with a "user device" or a "network device". As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the term "network component" may refer to a network device, or a component, piece, portion, or combination of a network device. Examples of network components may include a Static Random Access Memory (SRAM) device or module, a network processor, and a network communication path, connection, port, or cable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices.

Examples of processors include, without limitation, Intel® Core™ processors by Intel Corporation or $M_1$ processors by Apple, Inc.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather can include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by, e.g., appropriately- and/or specially-programmed general purpose computers and/or computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated amongst a variety of devices.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application. Applicant reserves the right to file additional applications to pursue patents for subject matter that has been disclosed and enabled but not claimed in the present application.

What is claimed is:

1. A player tracking interface device comprising:
- a housing;
- a mobile device holder connected to the housing for holding a mobile device associated with a player;
- a wireless mobile device charger connected to the housing;
- a camera connected to the housing;
- a wireless communications transceiver connected to the housing;
- a card reader connected to the housing, the card reader being configured to receive identification information stored on or otherwise accessible via a player tracking card;
- a processor connected to the housing; and
- a computer-readable memory in communication with the processor, the computer-readable memory storing instructions that when executed by the processor direct the processor to perform:
  - detecting placement of the mobile device in the mobile device holder;
  - identifying the player associated with the mobile device;
  - providing player information associated with the player via a display of the mobile device while the mobile device is placed in the mobile device holder;
  - receiving player identification information;
  - verifying an identity of the player;
  - after verifying the identity of the player, not requiring the mobile device to remain placed in the mobile device holder;
  - determining the identity of the player must be verified again;
  - prompting the player to place the mobile device in the mobile device holder again;
  - after detecting placement of the mobile device in the mobile device holder again:
  - receiving the player identification information; and
  - verifying the identity of the player a second time.

2. The player tracking interface device of claim 1, wherein the mobile device holder comprises a shelf.

3. The player tracking interface device of claim 2, wherein the shelf is configured to hold a mobile device for a player standing or sitting next to the shelf.

4. The player tracking interface device of claim 1, wherein the mobile device holder comprises the wireless communications transceiver.

5. The player tracking interface device of claim 1, wherein the wireless communications transceiver is configured for implementing a near-field communication protocol and/or a one or more other wireless communication protocols.

6. The player tracking interface device of claim 1, wherein the mobile device holder comprises the wireless mobile device charger.

7. The player tracking interface device of claim 1, wherein the mobile device charger is a wireless mobile device charger.

8. The player tracking interface device of claim 1, wherein the housing is embodied as a panel connected modularly to a gaming device.

9. The player tracking interface device of claim 1, wherein the housing is embodied as a panel for retrofitting a customer-facing device.

10. The player tracking interface device of claim 1, wherein at least one of the following is in communication, via a corresponding connection, with a computing device of a customer-facing device:
- the wireless communications transceiver,
- the camera,
- the wireless mobile device charger, and/or
- the card reader.

11. The player tracking interface device of claim 10, wherein the computing device comprises a slot machine interface board (SMIB).

12. The player tracking interface device of claim 10, wherein the wireless communications transceiver is in communication with the computing device via a universal serial bus (USB) connection.

13. The player tracking interface device of claim 1, further comprising at least one light source.

14. The player tracking interface device of claim 13, wherein the at least one light source is configured with the wireless communications transceiver to provide a first visual indication when a mobile device is in communication with the wireless communications transceiver and to provide a second visual indication when a mobile device is not in communication with the wireless communications transceiver.

15. The player tracking interface device of claim 13, wherein the at least one light source comprises a light-emitting diode (LED).

16. A system comprising:
- a player tracking server;
- a player tracking interface device comprising a shelf for holding a mobile device associated with a player, wherein the player tracking interface device is in communication with the player tracking server;

a processor in communication with the player tracking interface device; and a computer-readable memory in communication with the processor, the computer-readable memory storing instructions that when executed by the processor direct the processor to perform:

detecting placement of the mobile device on the shelf;

identifying the player associated with the mobile device;

providing player information associated with the player via a display of the mobile device while the mobile device is placed on the shelf;

receiving player identification information;

verifying an identity of the player;

after verifying the identity of the player, not requiring the mobile device to remain placed on the shelf;

determining the identity of the player must be verified again;

prompting the player to place the mobile device on the shelf again;

after detecting placement of the mobile device on the shelf again:

receiving the player identification information; and verifying the identity of the player a second time.

17. The system of claim 16, further comprising a gaming device in communication with the player tracking interface device, wherein the shelf for holding the mobile device is connected to the gaming device.

18. The system of claim 16, wherein the player tracking interface device is in communication with the player tracking server via a gaming device.

19. The system of claim 16, wherein the player tracking interface device is in communication with the player tracking server via a kiosk.

20. The system of claim 16, wherein the player tracking interface device is embodied in a panel modularly connected to a customer-facing device.

21. A gaming device comprising:

a housing;

a gaming controller, connected to the housing, for providing game play;

a player tracking interface device connected to the housing, the player tracking interface device comprising a shelf for holding a mobile device associated with a player;

a processor connected to the housing; and a computer-readable memory in communication with the processor, the computer-readable memory storing instructions that when executed by the processor direct the processor to perform:

detecting placement of the mobile device on the shelf;

identifying the player associated with the mobile device;

providing player information associated with the player via a display of the mobile device while the mobile device is placed on the shelf;

receiving player identification information;

verifying an identity of the player;

after verifying the identity of the player, not requiring the mobile device to remain placed on the shelf;

determining the identity of the player must be verified again;

prompting the player to place the mobile device on the shelf again;

after detecting placement of the mobile device on the shelf again:

receiving the player identification information; and verifying the identity of the player a second time.

22. An apparatus comprising:

a processor;

a shelf; and a computer-readable memory in communication with the processor, the computer-readable memory storing instructions that when executed by the processor direct the processor to perform:

detecting placement of a mobile device on the shelf;

identifying a player associated with the mobile device;

providing player information associated with the player via a display of the mobile device while the mobile device is placed on the shelf;

receiving player identification information;

verifying an identity of the player;

after verifying the identity of the player, not requiring the mobile device to remain placed on the shelf;

determining the identity of the player must be verified again;

prompting the player to place the mobile device on the shelf again;

after detecting placement of the mobile device on the shelf again:

receiving the player identification information; and verifying the identity of the player a second time.

23. The apparatus of claim 22, wherein the instructions when executed by the processor further direct the processor to perform one or more of the following:

charging the mobile device;

receiving player identification information;

verifying an identity of the player; and/or transmitting player identification information to a player tracking server.

* * * * *